United States Patent Office 2,859,745
Patented Nov. 11, 1958

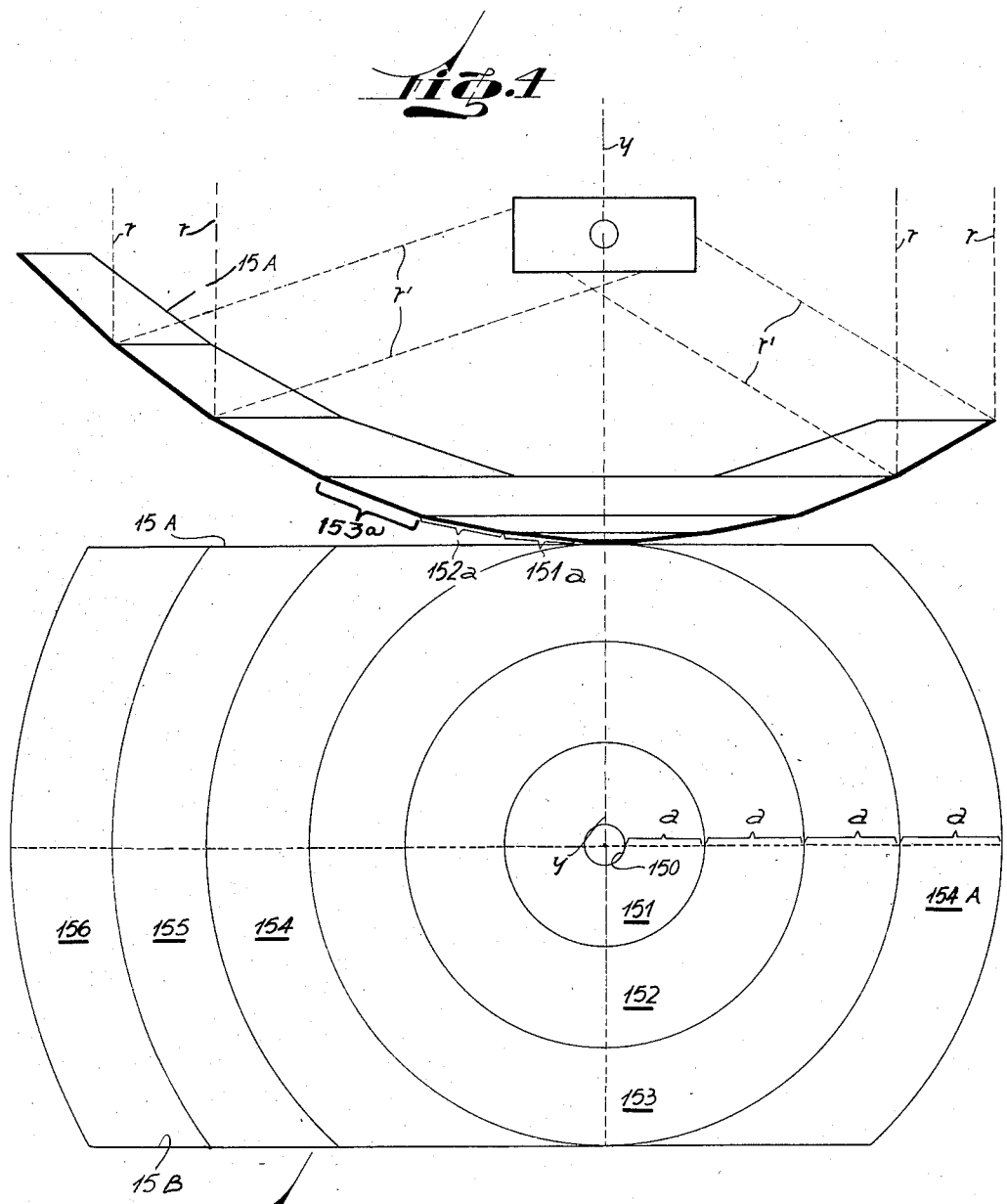

2,859,745

SOLAR ENERGY OPERATED HEATERS

Luis von Brudersdorff, Buenos Aires, Argentina

Application May 4, 1954, Serial No. 427,579

3 Claims. (Cl. 126—270)

The present invention relates to improvements in solar-heat operated heaters and more particularly it refers to improvement in the solar heat reflecting heater disclosed in my patent application Serial No. 292,679, now abandoned, of which the present application is a continuation-in-part.

Reflectors which, in order to use the heat of the sun-rays, reflect and concentrate these onto a focal point, are already known, and the heat generated thereby is generally employed in order to melt metals or for other purpose requiring relatively high temperatures. The main purpose of the present invention is to provide a reflector for producing heat of a relatively low temperature, for instance, of the range of temperatures of the heat generated by a burner of a gas or electric stove, that is a degree of heat sufficient to heat, boil, cook, toast, roast or fry food within a reasonably short period of time without burning or damaging the food or the utensils employed. The invention thus proposes a device which may be used instead of the cooking ranges producing heat from fuel or electric energy, especially at places where these sources of heat are not available. Thus for instance it is one object of the invention to provide a portable apparatus of reduced size which, if desired, may be at least partially collapsible, so that it may be easily taken outdoors, on excursions, picnics, etc., in order to be used as a kitchen range, and which employs only an exclusively solar heat so that there is no need for fuel or for installations for supplying combustible gas or electric currents.

In the following one particularly advantageous embodiment, which allows the above objects and others, which will become evident, to be achieved, will be described by way of example. Such embodiment has also been represented in the accompanying drawings.

Figure 3 is a partially schematic, plan view illustrating the general principle on which the mirror or reflector which forms part of the apparatus, is based; and Figure 4 is a schematic longitudinal section illustrating the principle of the mirror or reflector.

Throughout the several figures of the drawings the same reference numerals have been used in order to designate equal or corresponding parts of the device.

Figure 1:
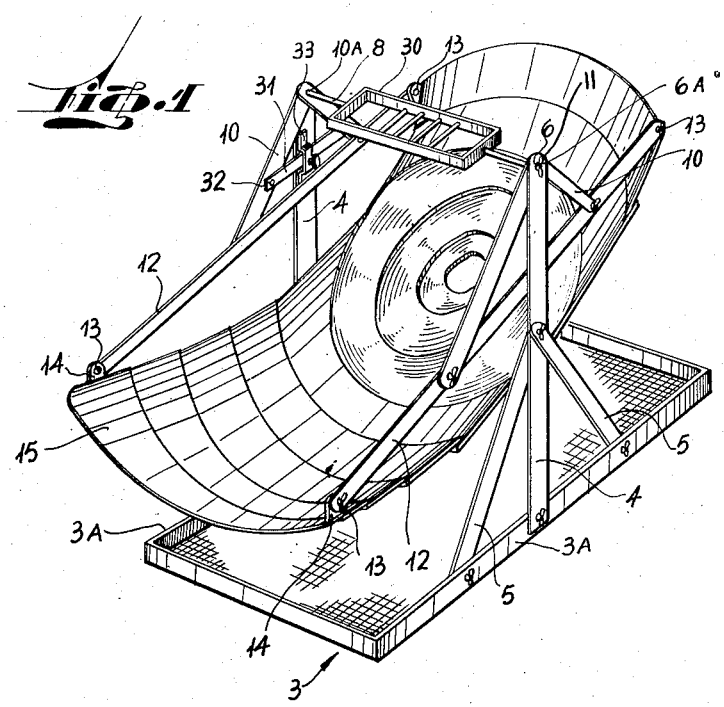
Figure 1 is a perspective view of a solar heat reflecting apparatus, according to the present invention.
Figure 2:
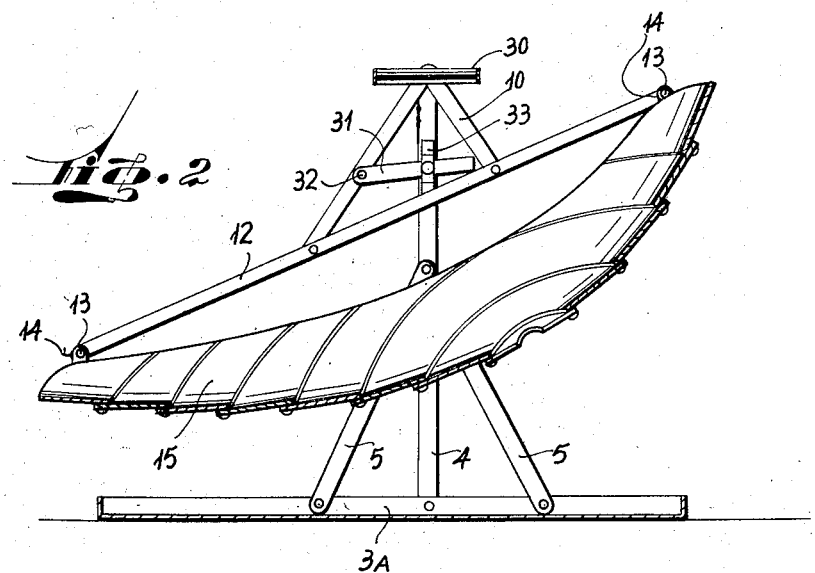
Figure 2 is a longitudinal section through said apparatus.

Referring to Figures 1 and 2, it may be seen that the solar heat reflecting apparatus represented therein comprises a rectangularly shaped base 3. At the centre of each of the lateral base frame members 3–A an upright 4 is mounted by means of one and preferably two diagonal struts 5. As may be seen the lower ends of the uprights 4 and the struts 5 are secured to lateral members 3A by means of screws, and similarly each upright 4 is connected to the associated struts 5 by screws.

At their upper ends, uprights 4 carry a transverse support member 8, extending from one upright to the other. The ends of the transverse member 8 are rivetted to the respective upright or are removably secured thereto by nuts or the like.

Integral with transverse member 8, or supported thereon, there is a grill 30 or the like on which the article to be heated may be placed.

At the upper end, each upright is provided with an opening 6A wherein a pin 6 is inserted. Each pin 6 also passes through a corresponding opening 10A arranged at the apex of a triangular support structure 10 for the reflector. One of the ends of each pin has screw-threads, so that the triangular support structure 10 may be adjusted in any desired angular position by means of adjusting nut 11, or the like. The opposite end of each pin 6 is provided with a head greater in cross-section than the cross-sectional area of openings 6A, 10A.

In order to further provide for the adjustment of the triangular support structure 10 in any desired angular position, an adjusting bar 31 is pivoted at 32, to at least one of the lateral members of the structure 10. The adjusting bar 31 is secured to upright 4 by clamping slide 33 at any desired position wherein the structure 10 is to be fixed against angular movement.

It will be evident that the adjusting bar 31 and clamping slide 33 may be omitted or alternatively, if they are provided, pin 6 may be nonadjustable and may freely support the structure 10 for angular movement on pivot 6, which in such event may be of hook-like shape, whilst only adjusting bar 31 and clamping slide 33 will be used for adjusting the structure 10 in a given angular position.

At both ends of base members 12, the triangular supporting structures 10 are secured as by rivets 13, or screws, to the lugs 14 of the mirror or reflector proper 15.

The reflecting mirror 15 comprises a number of members, preferably of sheet metal, such as aluminium sheets, which are shaped and assembled according to the general principle schematically illustrated in Figures 3 and 4.

In order to understand said principle, it should be realized that a strictly parabolic mirror reflects all sun rays on to the focal point of the parabola, so that all the heat would be concentrated on this focal point. Such effect is not desired for the purpose of the present invention, since at this point the heat would burn the vessel, pan or other utensil employed for heating the food when the same is located at the focal point. According to the present invention a different effect is desired to be obtained, namely that of concentrating the heat on an area, rather than on a point.

Referring to Figures 3 and 4, it may be seen that the mirror 15 comprises an annular member 151 surrounded by another ring member 152, which in turn is surrounded by a third ring-shaped member 153. These three bodies will now be considered in detail.

The ring-shaped body 151 has a width (in radial direction) of a convenient measure, for instance the width indicated with the reference numeral 151a in Figure 4. The reflecting face of said member is in radial direction a plain surface as can be seen from Figure 4. On the other hand the inner and outer peripheries of member 151 are located on a paraboloidal body of revolution which thus determines the inclination of the reflecting surface towards the axis Y of the paraboloid.

The adjacent member 152 has also its inner and outer peripheries (the inner periphery coinciding with the outer periphery of member 151) located on the same paraboloidal body of revolution, so that the inclination of its radially plain reflecting face towards the axis Y of the paraboloid is steeper than the inclination of member 151. If the radial width 152a of member 152 were equal to that of member 151, the heat reflected by member 152 would be concentrated on a smaller area around the forms of the paraboloid. According to the present invention, it is desired, however, that the area on which the heat reflected by member 152 is concentrated, be equal to the area corresponding to the heat reflected by member 151. The radial width 152a is consequently greater than 151a and the rate is determined by the projection of the body in a horizontal plane as may be seen by comparison with Figure 3 wherein the radial width a of the projections in a horizontal plane of members 151 and 152 is a constant value.

The locus of the circumferential edges of the annular reflecting members composing the mirror is therefore a paraboloid of revolution and the peripheries of the members are located at the intersection of the paraboloid with cylindrical, concentrical bodies the axis of which is the axis of the paraboloid and which are equi-distant one from another in a plane perpendicular to said axis. On the other hand, the annular members from one periphery to another are radially plain and not curved, so that each line drawn in the plane of the reflecting face of each member towards the axis of the paraboloid represents the shortest distance between the outer and inner peripheries.

Similarly the member 153 is shaped and mounted so that its inclination again is steeper towards the axis of the paraboloid of revolution and the width 153a thereof, which is bigger than 152a, corresponds, if projected on a horizontal plane, to the value a.

In the same way the members 154, 155 and 156 are formed but, in order to reduce the total size of the mirror and to permit that the sun rays may be captured even when the sun is low (early or late in the day or in winter) use is preferably made of sectors of the bodies 154, 155 and 156 which sectors are obtained by cutting the annular members along the parallel sides 15A and 15B into sectors of smaller size. It may also be convenient to omit several of the sectors at one of the longitudinal ends of the assembly, as shown in Figures 3 and 4 where members 154 and 154A form equal sectors of one annular body but beyond member 154A on one side of the reflector, no further sector is arranged whilst at the opposite side additional sector members 155 and 156 are provided.

In Figure 4 the dotted lines $r$ indicate the sun rays reaching the members 154A and 155 and the dotted lines $r'$ indicate that they are all reflected on one single area around the focus of the paraboloid. It will be evident that all the remaining members reflect the rays onto the same area whereby a uniform and adequate distribution of the heat is achieved so that the same may be used for subjecting food to the desired heat treatment.

The annular members or sectors may be assembled by any suitable means. In Figures 1 and 2 said members are shown in slightly overlapping relationship and joined together by rivets passing through the overlying portion of each pair of adjacent members. It is, however, also possible to join together the members of the assembly by pressing or stamping operations and in this case, instead of the step-like arrangement shown, the edge of each member will lie in the same plane as the adjacent edge of the next member.

The size of reflector 15 depends entirely on the dimensions desired to be employed for a given purpose. The curvature of the paraboloid of revolution circumscribing the individual reflecting members may also be selected within ample limits. I have found that a paraboloid, the focus of which is at a distance of approximately 30 to 65 cm. from the vertex gives satisfactory results.

It will be understood that, many variations may be introduced in the structure described without determining from the scope of the invention. Thus for instance, it is possible to vary the construction of the support for the mirror or for the article to be heated but generally it will be convenient to employ light structures of relatively small dimensions and which preferably should be made in section or collapsible.

I claim:

1. In a device for cooking food with solar energy comprising a sun ray reflector having a paraboloidal reflecting surface comprising a plurality of concentric radially plane annular sections, the inner and outer peripheries of said sections being located in the intersections of a paraboloidal body of revolution with concentric cylinders, the common axis of which is the axis of said paraboloidal body, said paraboloidal reflecting surface having a focal area positioned outside of the trough defined by said paraboloidal reflecting surface, a pair of opposed uprights, support means pivotally suspended from said uprights, said support means supporting said reflector for pivotal movement about an axis passing through the focal area to change the angular position of the axis of the paraboloidal body circumscribing said reflecting surface toward the sun, said support means including two triangular supports, one triangular support being suspended at its apex from each upright, means for adjusting said reflector in any of said angular positions, and means for supporting the object to be heated in the focal area.

2. A device as defined in claim 1 wherein at least one of said uprights is provided with a bar, said bar being pivotally connected to one side of said triangular support and slidably mounted with respect to said upright and means for clamping said bar to said upright.

3. A device as defined in claim 2 wherein each upright is braced by at least one diagonal strut.

References Cited in the file of this patent

UNITED STATES PATENTS

| | | |
|---|---|---|
| 277,884 | Clark | May 22, 1883 |
| 412,724 | Calver | Oct. 15, 1889 |
| 820,127 | Pope | May 8, 1906 |
| 1,366,454 | Hensal | Jan. 25, 1921 |
| 1,390,258 | Geneste | Sept. 6, 1921 |
| 1,421,506 | Limpert | July 4, 1922 |
| 1,424,932 | Moreau | Aug. 8, 1922 |
| 1,579,627 | Bell | Apr. 6, 1926 |
| 1,695,061 | Robinson | Dec. 11, 1928 |
| 1,951,404 | Goddard | Mar. 20, 1934 |
| 2,182,222 | Courtis | Dec. 5, 1939 |
| 2,259,902 | McCain | Oct. 21, 1941 |
| 2,791,214 | Poliansky | May 7, 1957 |